United States Patent
Monier et al.

(10) Patent No.: US 12,058,232 B2
(45) Date of Patent: *Aug. 6, 2024

(54) FRAME COMPATIBILITY ACROSS NETWORK PROTOCOL VERSION

(71) Applicant: ITRON, INC., Liberty Lake, WA (US)

(72) Inventors: Fabrice Monier, Bry sur Marne (FR); Keith Wayne Barnes, Waseca, MN (US); Imad Jamil, Beynes (FR); Thomas Uhling, Spokane Valley, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,558

(22) Filed: Nov. 2, 2022

(65) Prior Publication Data

US 2023/0052930 A1    Feb. 16, 2023

Related U.S. Application Data

(63) Continuation of application No. 17/133,227, filed on Dec. 23, 2020, now Pat. No. 11,516,320.

(51) Int. Cl.
*H04L 69/22* (2022.01)
*H04L 69/12* (2022.01)
*H04L 69/16* (2022.01)

(52) U.S. Cl.
CPC .............. *H04L 69/22* (2013.01); *H04L 69/12* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 6,922,404 | B1 | 7/2005 | Narayanan et al. |
| 11,516,320 | B2 * | 11/2022 | Monier ................... H04L 69/12 |
| 2003/0126547 | A1 | 7/2003 | Hardie et al. |
| 2004/0258002 | A1 | 12/2004 | Tran et al. |
| 2008/0008131 | A1 | 1/2008 | Watfa et al. |
| 2008/0031261 | A1 * | 2/2008 | Addeo ................... H04L 43/00 |
| | | | 370/395.53 |
| 2009/0310511 | A1 | 12/2009 | Vaswani et al. |
| 2011/0116480 | A1 | 5/2011 | Li et al. |
| 2011/0222413 | A1 * | 9/2011 | Shukla ................ H04L 43/0811 |
| | | | 370/241.1 |

(Continued)

OTHER PUBLICATIONS

IEEE Standards Association, "IEEE Standard for Low-Rate Wireless Personal Area Networks (WPANs)", IEEE Computer Society, https://ieeexplore.ieee.org/document/7460875, IEEE Std 802.15.4-2015 (Revision of IEEE Std 802.15.4-2011) Dec. 5, 2015, 709 pages.

(Continued)

*Primary Examiner* — Lonnie V Sweet
(74) *Attorney, Agent, or Firm* — Artegis Law Group, LLP

(57) ABSTRACT

One embodiment of the present invention sets forth a technique for processing packets transmitted within a network in accordance with a network protocol. The technique includes a network device in a mesh network receiving a type-length-value (TLV) element, determining, based on a type field of the TLV element, an expected length of a value field of the TLV element, and processing the value field up to the expected length.

18 Claims, 6 Drawing Sheets

(56) References Cited

U.S. PATENT DOCUMENTS

| | | |
|---|---|---|
| 2012/0231441 A1 | 9/2012 | Parthasarathy et al. |
| 2013/0176892 A1 | 7/2013 | Shukla |
| 2013/0246850 A1* | 9/2013 | Gelter .................... G08B 29/12 |
| | | 714/E11.178 |
| 2013/0279392 A1 | 10/2013 | Rubin et al. |
| 2013/0279393 A1 | 10/2013 | Rubin et al. |
| 2014/0215011 A1 | 7/2014 | Fu et al. |
| 2015/0201045 A1* | 7/2015 | Komirelly ............. H04L 69/162 |
| | | 709/203 |
| 2016/0286452 A1 | 9/2016 | Tian |
| 2016/0366051 A1 | 12/2016 | Chen et al. |
| 2017/0272353 A1 | 9/2017 | Cao et al. |
| 2018/0013631 A1 | 1/2018 | Chen |
| 2018/0115515 A1 | 4/2018 | Herrero |
| 2019/0306542 A1 | 10/2019 | Takahashi et al. |
| 2020/0287824 A1 | 9/2020 | Dutta |

OTHER PUBLICATIONS

Heile et al., "Wi-SUN FAN Overview draft-heile-lpwan-wisun-overview-00", https://tools.ietf.org/id/draft-heile-lpwan-wisun-overview-00.html, Jul. 3, 2017, 10 pages.
Wi-SUN Alliance, "Field Area Network Working Group Field Area Network Technical Overview", https://wi-sun.org/download/fan-1-0-overview/?wpdmdl=66429&refresh=61254babd30af1629834155, 2018-2019, 23 pages.
Information Sciences Institute University of Southern California, "Internet Protocol DARPA Internet Program Protocol Specification", https://datatracker.ietf.org/doc/html/rfc791, Sep. 1981, 96 pages.

* cited by examiner

| Field | Length | Description | |
|---|---|---|---|
| Type | 1 Byte | set to 0x01 (link quality) | 402 |
| Length | 1 Byte | set to 1 | 404 |
| RSSI | 1 Byte | stores the RSSI for the link | 406 |

FIG. 4A

| Field | Length | Description | |
|---|---|---|---|
| Type | 1 Byte | set to 0x01 (link quality) | 412 |
| Length | 1 Byte | set to 2 | 414 |
| RSSI | 1 Byte | stores the RSSI for the link | 416 |
| SNR | 1 Byte | stores the SNR for the link | 418 |

FIG. 4B

| Field | Length | Description | |
|---|---|---|---|
| Type | 1 Byte | set to 0x02 (neighbors) | 502 |
| Length | 1 Byte | set to 9 + 8*(number of neighbors) | 504 |
| Node Address | 8 Bytes | Address of the node seeing these neighbors | 506 |
| Number of Neighbors | 1 Byte | Number of elements in the Neighbor Address List field | 508 |
| Neighbor Address List | 8*Number of Neighbors | List of neighbor addresses | 510 |

FIG. 5A

| Field | Length | Description | |
|---|---|---|---|
| Type | 1 Byte | set to 0x02 (neighbors) | 512 |
| Length | 1 Byte | set to 9 + 9*(number of neighbors) | 514 |
| Node Address | 8 Bytes | Address of the node seeing these neighbors | 516 |
| Number of Neighbors | 1 Byte | Number of elements in the Neighbor Address List field | 518 |
| Neighbor Address List | 8*Number of Neighbors | List of neighbor addresses | 520 |
| Neighbor Link Quality List | 1*Number of Neighbors | List of neighbor link qualities | 522 |

FIG. 5B

FRAME COMPATIBILITY ACROSS NETWORK PROTOCOL VERSION

CROSS-REFERENCE TO RELATED APPLICATIONS

The present application is a continuation of United States application titled "FRAME COMPATIBILITY ACROSS NETWORK PROTOCOL VERSIONS," filed on Dec. 23, 2020, and having Ser. No. 17/133,227. The subject matter of this related application is hereby incorporated herein by reference.

BACKGROUND

Field of the Various Embodiments

Embodiments of the present disclosure relate generally to computer science and networks and, more specifically, to techniques for improving frame compatibility across network protocol versions.

Description of the Related Art

Designing a network protocol usually is a fairly iterative process that typically involves multiple rounds of revisions. A given round of revisions may add one or more new features to the network protocol, fix bugs or other issues in the network protocol, and/or make other changes to the network protocol. The various changes to the network protocol during the design process can be tracked using the different versions of the network protocol.

As a general matter, a new version of a network protocol oftentimes includes some type of modification to the frame format used for network packets that are transmitted and processed in accordance with the network protocol. Problematically, the modified frame format sometimes causes compatibility issues with devices that implement older versions of the network protocol. For example, a device that supports an older version of a network protocol could have trouble understanding and processing one or more elements of a frame that was generated in accordance with a new version of that network protocol.

One approach resolving the differences across the frame formats associated with different versions of a network protocol is to add a version field to the frame format. In such an approach, a network device compares the version number in the version field of a given frame with the version number corresponding to the most recent version of the network protocol supported by the device. If the version number corresponding to the most recent version supported by the device is equal to or greater than the version number in the version field of the frame, then the device is going to be able to process the frame. Conversely, a legacy network device that supports only older versions of the protocol (where the version number corresponding to the most recent version of the protocol supported by the legacy network device is less than the version number stored in the version field) is not going to be able to process the frame because the legacy network device is not going to be able to understand one or more of the elements within the frame.

One drawback to including version numbers in the frames of a network protocol is a lack of compatibility between frames with different version numbers for the same network protocol. This lack of compatibility prevents legacy devices that implement older versions of the network protocol from using information in frames that conform to formats specified in newer versions of the network protocol, which reduces the functionality provided by the network protocol to the legacy devices.

Another approach to resolving differences across the frame formats associated with different versions of a network protocol is to construct frames with a list of type-length-value (TLV) elements. A TLV element usually includes a type field, a length field, and a value field. The type field and length field are typically fixed length (or have a length that can be discerned based on a known pattern across all versions of the network protocol) and specify the type of data in the value field and the length of the value field, respectively, and the value field typically stores one or more values related to the type specified in the type field. For example, a TLV element could include a two-byte type field set to a value representing link quality, a two-byte length field that stores an integer value representing the number of bytes in the value field, and one or more values in the value field that span the number of bytes specified in the length field and include a Received Signal Strength Indicator (RSSI), Signal-to-Noise Ratio (SNR), and/or other attributes related to the quality of a link.

One drawback to including TLVs in the frames of a network protocol is increased overhead in storing and processing information within the frames. In particular, new TLV elements are typically added to include new types of information in the frame. Each new TLV includes an additional type field and length field, which reduces the pool of available types that can be used in TLVs within the frames; increases the overall size of the frame; and increases bandwidth, memory, and processing overhead associated with transmitting and processing the frame.

Instead of adding new TLV elements to the frame, reserved bits or bytes may be used to differentiate between different types or versions of TLV elements in a frame. However, an increase in the number of reserved bits or bytes in a TLV element also increases resource overhead in processing and storing information within the frame. Conversely, an inadequate number of reserved bits or bytes may accommodate only a limited number of changes to the frame format. Once the available number of changes is exhausted for a given TLV element, additional changes to the frame format may be included in new TLV elements, which further contributes to resource overhead in network protocol implementations that perform processing based on the frame format.

As the foregoing illustrates, what is needed in the art are more effective techniques for transmitting and processing network packets in accordance with different versions of a network protocol.

SUMMARY

One embodiment of the present invention sets forth a technique for processing packets transmitted within a network in accordance with a network protocol. The technique includes determining a first expected length of a value field included in a type-length-value (TLV) element within a first frame of a first packet received over the network, wherein the first expected length is based on a type field included in the TLV element and one or values included in the value field. The technique also includes processing a first portion of the value field based on the expected length of the value field in accordance with a first specification for a first version of the network protocol, without processing a second portion of the value field beyond the expected length of the value field.

One technical advantage of the disclosed techniques relative to the prior art is that the disclosed techniques enable a TLV element within a frame to be updated based on both fixed-length and variable-length sub-fields within the value field of the TLV element. With this approach, functionality related to new versions of the network protocol can be added, while ensuring that the TLV element can still be processed based on older versions of the network protocol, which enhances cross-compatibility across different versions of the network protocol. Another technical advantage is that the disclosed techniques require a smaller number of TLV elements to be added to a given frame relative to prior art approaches, which reduces overall overhead when transmitting and processing network packets in accordance with different versions of a network protocol. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4A illustrates an exemplar specification for a TLV element based on an older version of a network protocol, according to various embodiments.

FIG. 4B illustrates an exemplar specification for the TLV element of FIG. 4A based on a newer version of the network protocol, according to various embodiments.

FIG. 5A illustrates an exemplar specification for a TLV element based on an older version of a network protocol, according to various embodiments.

FIG. 5B illustrates an exemplar specification for the TLV element of FIG. 5A based on a newer version of the network protocol, according to various embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
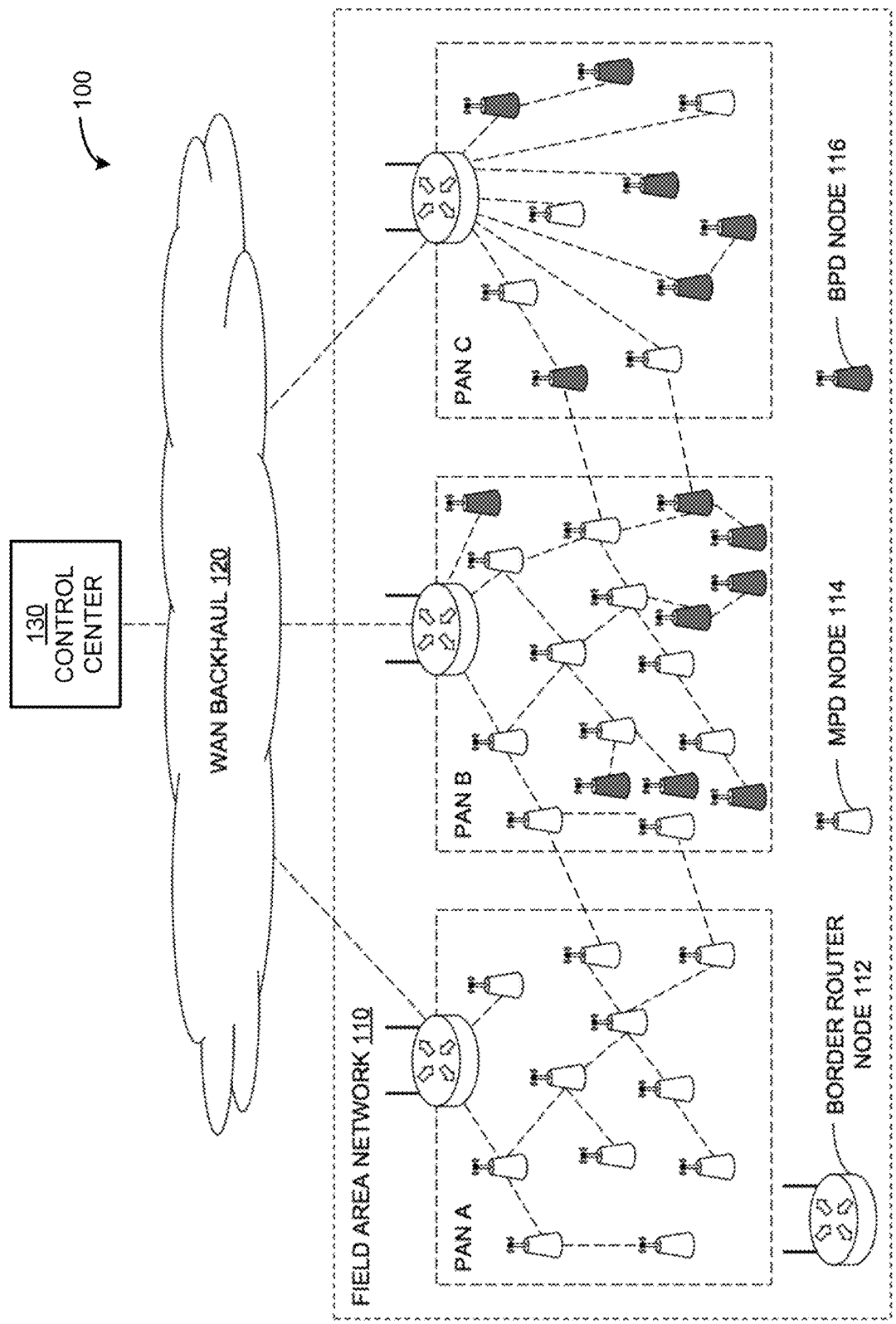
FIG. 1 illustrates a network system configured to implement one or more aspects of various embodiments.

FIG. 1 illustrates a network system 100 configured to implement one or more aspects of various embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. It will be appreciated that PANs A, B, or C can be organized according to other network topologies or structures. For example, one or more PANs could be configured in a tree-like network structure, such as a Destination Oriented Directed Acyclic Graph (DODAG) with parent nodes, child nodes, and a root node.

Each of PANs A, B, and C includes at least one border router node 112 and one or more mains powered device (MPD) nodes 114. PANs B and C further include one or more battery powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 130 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Any of border router nodes 112, MPD nodes 114, and BPD nodes 116 additionally include functionality to communicate directly with one or more adjacent nodes via bi-directional communication links. The communication links may be wired or wireless links, although in practice, adjacent nodes of a given PAN or across multiple PANs exchange data with one another by transmitting data packets via wireless radio frequency (RF) communications.

Each node within a given PAN may implement a discovery protocol to identify one or more adjacent nodes, or "neighbors." A node that has identified a spatially adjacent, neighboring node may establish a bi-directional communication link with the neighboring node. For example, a node that is discovered another node could exchange media access control (MAC) addresses and schedule future communications with the other node based on those MAC addresses. Each neighboring node could update a respective neighbor table to include information concerning the other node, including the MAC address of the other node as well as a received signal strength indication (RSSI) of the communication link established with that node.

Once adjacency is established between nodes, any of those nodes can communicate with any of the other nodes via one or more intermediate nodes and one or more communications links associated with the intermediate node(s). In other words, communication links between adjacent nodes that have discovered one another may be used by the nodes to form a mesh network, independent of network topologies or structures associated with individual PANs A, B, or C. Nodes in the mesh network may additionally communicate with one another via the communication links in the mesh network instead of relying on the network structures and/or connections in WAN backhaul 120 or PANs A, B, or C. For example, communications links established between one or more nodes in PAN A and one or more nodes in PAN B, and between one or more nodes in PAN B and one or more nodes in PAN C, could be used to transmit Internet protocol (IP) packets, command messages, metrology data, and/or other technically feasible data units between or among nodes in the mesh network without routing the data through WAN backhaul 120.

In some embodiments, a subset of nodes in the mesh network is added to a multicast group to communicate specific information with one another. Membership of nodes in the multicast group may additionally be independent of the grouping of nodes under multiple PANs A, B, and C. For example, nodes that include smart meters grouped under the same transformer in a power grid could form a multicast group and communicate with one another by transmitting multicast messages within the multicast group. These multicast messages could be used by the nodes to exchange or aggregate metrology data, propagate commands, or carry out other decisions or actions while minimizing or avoiding communication with control center 130.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse to reach the destination node. In one embodiment, each intermediate node may include a forwarding database indicating various network routes and cost metrics associated with each route.

Figure 2:
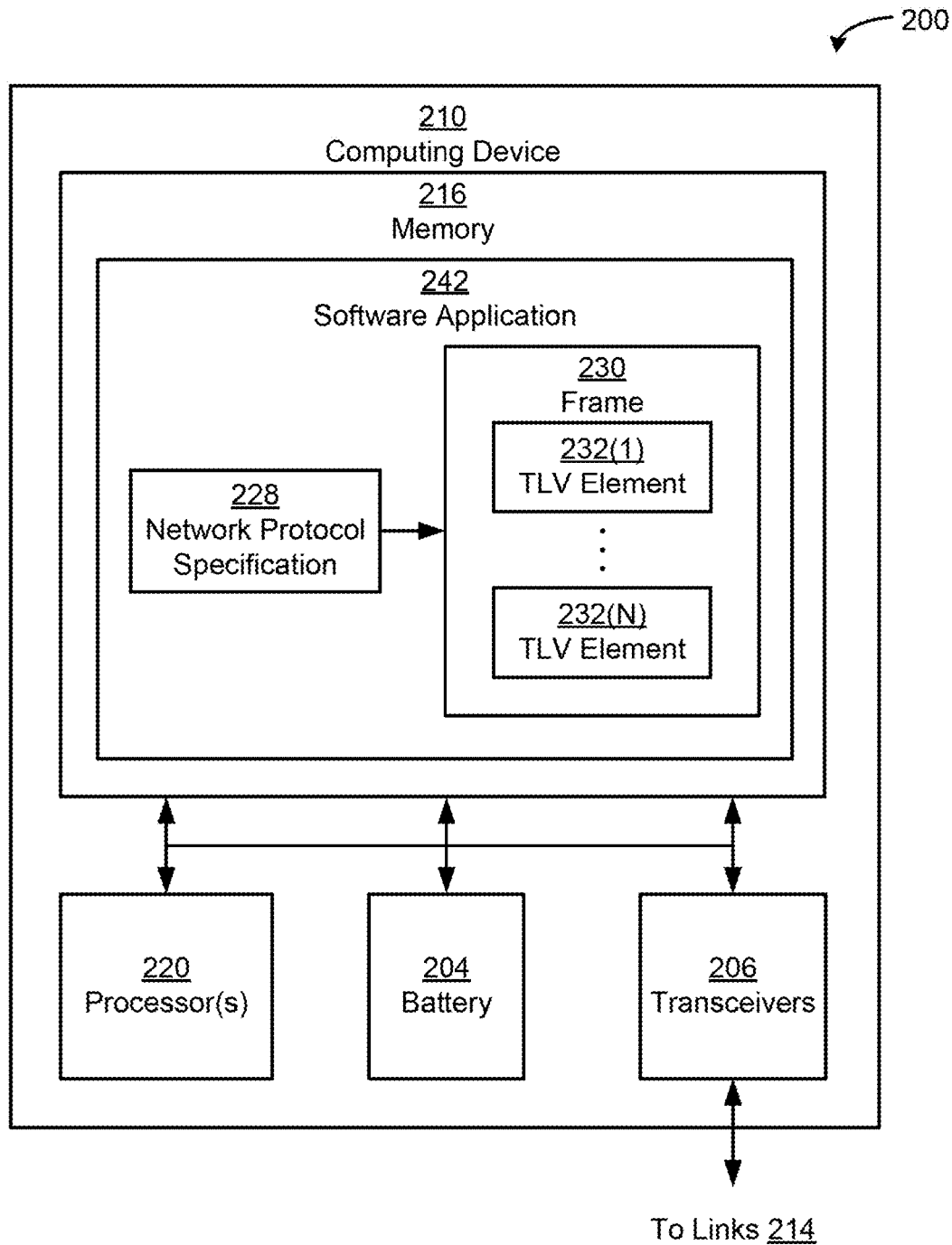
FIG. 2 illustrates a node configured to transmit and receive data within the network system of FIG. 1, according to various embodiments.

Nodes may include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary node that may operate within the network system 100.

FIG. 2 illustrates a node 200 configured to transmit and receive data within the mesh network of FIG. 1, according to various embodiments. Node 200 may be used to implement any of border router nodes 112, MPD nodes 114, and BPD nodes 116 of FIG. 1.

As shown, a node 200 includes a computing device 210. Computing device 210 includes one or more processors 220, a battery 204, one or more transceivers 206, and a memory 216 coupled together. Processors 220 may include any hardware configured to process data and execute software applications. For example, processors 202 could include one or more central processing units (CPUs), graphics processing units (CPUs), application-specific integrated circuit (ASICs), field programmable gate array (FPGAs), artificial intelligence (AI) accelerators, microprocessors, microcontrollers, other types of processing units, and/or a combination of different processing units (e.g., a CPU configured to operate in conjunction with a GPU).

Transceivers 206 are configured to transmit and receive data packets across network system 100 using a range of channels and power levels. Each transceiver includes one or more radios implemented in hardware and/or software to provide two-way RF communication with other nodes in network system 100 via one or more communications links 214. Transceivers 206 may also, or instead, include a cellular modem that is used to transmit and receive data with a cellular base station via a corresponding link.

Battery 204 supplies power to processors 220, transceivers 206, memory 216, and/or other components of computing device 210. For example, battery 204 could include sufficient capacity to allow computing device 210 to operate for a number of years without replacement and/or recharging. In some embodiments, power from battery 204 is supplemented with or replaced by a mains power supply, a solar panel, and/or another power source.

Memory 216 includes one or more units that store data and/or instructions. For example, memory 216 could include a random access memory (RAM) module, a flash memory unit, and/or another type of memory unit. Processors 220, transceivers 206, and/or other components of node 112 include functionality to read data from and write data to memory 116. Memory 216 includes software application 222, which includes program code that, when executed by one or more processors 220, performs any of the operations discussed herein.

In operation, software application 242 receives a frame 230 over one or more links 214 and performs processing of data transmitted in frame 230. In some embodiments, frame 230 includes a container for a network packet. Frame 230 may also encapsulate one or more other frames and/or be nested within one or more other frames for the network packet.

As shown, frame 230 includes a number of type-length-value (TLV) elements 232(1)-232(N), each of which is referred to individually as TLV element 232. Each TLV element 232 includes a type field, a length field, and a value field. The type field and length field are of fixed size and/or have a size that can be determined via a given pattern. The type field specifies the "type" of data in the value field, the length field specifies the length (e.g., in number of bytes) of the data in the value field, and the value field is of variable size and stores one or more values that can be identified and processed based on the type and/or length fields.

More specifically, software application 242 uses a network protocol specification 228 for a version of a network protocol to process a corresponding frame 230. Network protocol specification 228 may define a frame format for frame 230, which includes support for one or more types of TLV elements 232 in frame 230. Network protocol specification 228 may also specify fixed sizes of the type and length fields in each TLV element 232, valid values of the type and length fields in each TLV element 232, and/or rules or guidelines for interpreting or processing values in the value field in each TLV element 232 based on the corresponding type and/or length fields.

As the network protocol changes and evolves over time, network protocol specification 228 may be updated to support new functionality added to new versions of the network protocol. This new functionality may be implemented by adding data to one or more new TLV elements 232 within frame 230 and specifying how the data is to be processed, given the corresponding type and length fields. However, the new type field and length field in each new TLV element 232 increases the size of frame 230, which in turn increases computational overhead, bandwidth usage, and/or power consumption associated with transmitting and processing frame 230. When computing device 210 is powered solely by battery 204, this increased overhead reduces the runtime of battery 204 and may lead to interruptions in the operation of computing device 210.

In one or more embodiments, software application 242 and/or network protocol specification 228 mitigate computational overhead, bandwidth usage, and/or power consumption associated with processing additional data in frame 230 by adhering to a number of rules related to designing and processing TLV elements 232. As described in further detail below, the rules may allow new data to be added to existing TLV elements 232 in frame 230 instead of requiring new TLV elements 232 to be added to frame 230 to accommodate the new data. The rules may also allow TLV elements 232 to be compatible with multiple versions of the network protocol, thereby increasing the number of devices that are able to understand and use the data in frame 230. Consequently, the rules may reduce resource overhead associated with processing TLV elements 232 in frame 230 and improve the processing of frame 230 across devices and/or network protocol versions.

Improving Frame Compatibility Across Network Protocol Versions

Figure 3:
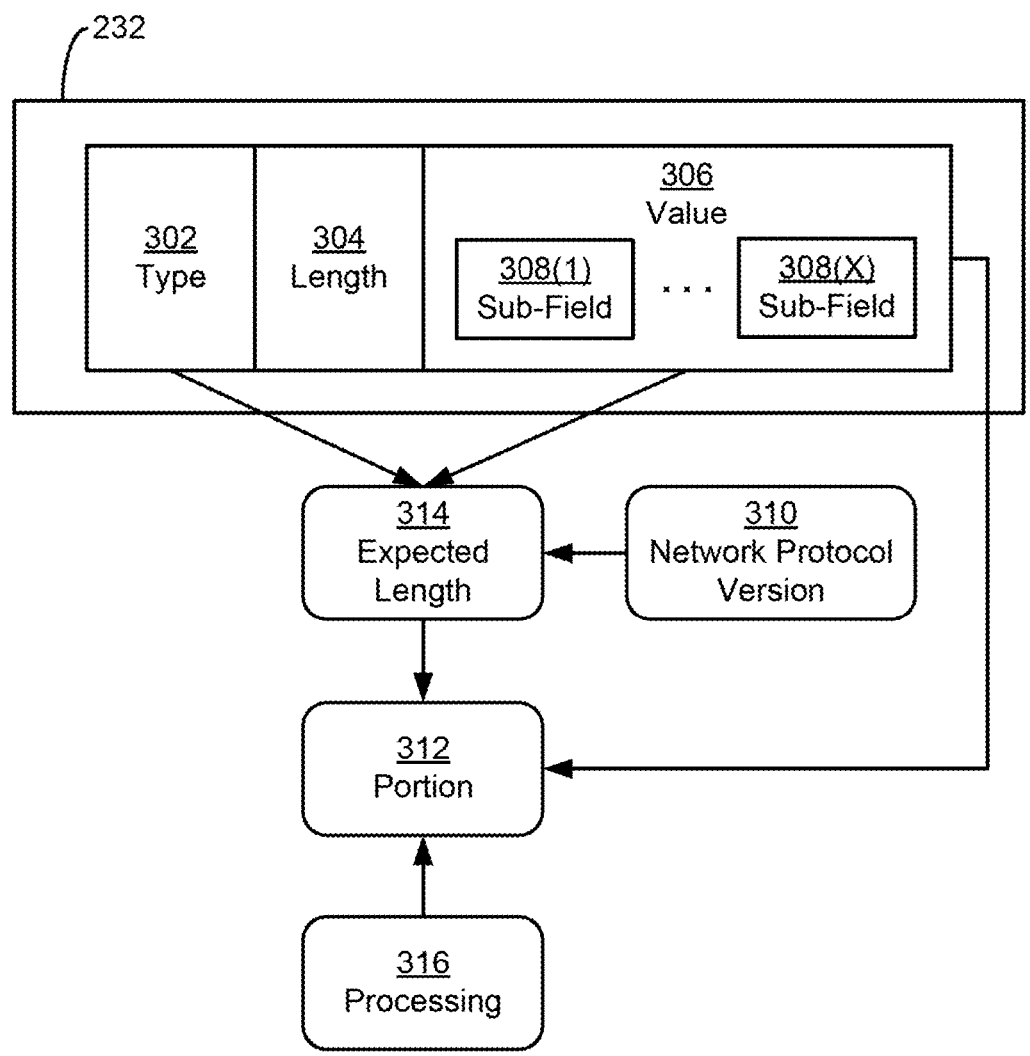
FIG. 3 illustrates the processing of a TLV element in a frame, according to various embodiments.

FIG. 3 illustrates the processing of TLV element 232 in a frame (e.g., frame 230 of FIG. 2), according to various embodiments. As shown, TLV element 232 includes a type 302 field, a length 304 field, and a value 306 field. Type 302 and length 304 are fixed-sized fields, while value 306 is variable-length. For example, type 302 could occupy a fixed number of bytes starting at the beginning of TLV element 232, length 304 could occupy a fixed number of bytes immediately following type 304, and value 306 could occupy a variable number of bytes immediately following the bytes occupied by length 304. Alternatively, type 302 and length 304 could be swapped in TLV element 232, so that length 304 occupies a fixed number of bytes starting at the beginning of TLV element 232 and type 302 occupies a fixed number of bytes immediately following length 304. The number of bytes occupied by value 306 is specified in length 304, and the type of data stored in value 306 is specified in type 304.

Value 306 additionally includes a number of sub-fields 308(1)-308(X), each of which is referred to individually as sub-field 308. Sub-fields 308 may include both fixed-size and variable-size attributes. For example, sub-fields 308 of value 306 for a type 304 that represents a set of neighbors of a node could include the address of the node, as well as a list of addresses of the node's neighbors. The address of the node could occupy a fixed number of bytes within a single sub-field 408, while the list of addresses for the node's neighbors could occupy a sub-field 308 with a variable number of bytes, which is determined based on the number of entries in the list.

As mentioned above, TLV element 232 may be designed and processed according to a number of rules. The rules include a first design-related rule specifying that each sub-field 308 of value 306 has a size that is either known or can be deduced from type 302 and/or other sub-fields 308. Continuing with the above example, the fixed number of bytes occupied by a first sub-field 308 storing the node's address may be defined by the specification for the network protocol associated with the frame. The variable number of bytes occupied by a second sub-field 308 storing a list of addresses for the node's neighbors may be determined from an additional sub-field that specifies the number of addresses in the list. In other words, the length of each sub-field 308 in value 306 can be determined without relying on length 304.

The rules also include a second design-related rule specifying that TLV element 232 can be modified by appending new sub-fields 308 to existing sub-fields 308 in value 306, and that TLV element 232 cannot be modified by removing existing sub-fields 308 from value 306. Thus, the ordering of sub-fields 308 in value 306 may reflect changes to TLV element 232 by different versions of the network protocol over time. Continuing with the above example, sub-fields 308 that store the node's address and a list of addresses for the node's neighbors may be added to TLV 232 by an older version of the network protocol, while a new sub-field 308 that stores a list of link quality attributes between the node and each of the node's neighbors may be added to TLV 232 by a newer version of the network protocol and therefore appended to the end of existing sub-fields 308 added by the older version of the network protocol (e.g., sub-fields 308 storing the node's address, the list of addresses for the node's neighbors, and the number of addresses in the neighbor address list).

The rules additionally include a first processing rule specifying that a given TLV 232 with a length that is smaller than an expected length 314 is to be ignored and not processed. The rules further include a second processing rule specifying that a given TLV 232 with a length that is greater than expected length 314 will be processed up to expected length 314 and not processed past expected length 314.

The design rules and processing rules allow TLV element 232 to be updated with both fixed-length and variable-length sub-fields 308 to support functionality provided by new versions of the network protocol, while ensuring that TLV element 232 can still be processed using implementations of older versions of the network protocol. In particular, the appending of new sub-fields 308 to the end of existing sub-fields 308 may be combined with processing of TLV 232 up to expected length 314 to ensure that older versions of the network protocol can be used to locate and process sub-fields 308 defined in specifications for the older versions while allowing newer versions of the network protocol to add and make use of new sub-fields 308 in value 306. Further, the lack of dependence on length 304 in resolving the sizes of individual sub-fields 308 in value 306 allows both various permutations of fixed-size and variable-size sub-fields 308 to be added to value 306 and subsequently located or identified within value 306.

The processing of TLV 232 according to the processing rules is illustrated in FIG. 3. First, a given device (e.g., computing device 210 of FIG. 2) determines expected length 314 based on type 302, value 306, and a network protocol version 310 implemented by the device. For example, the device could use a specification for network protocol version 310 to obtain a definition associated with TLV 232. This definition could include metadata related to type 302, length 304, and value 306. This metadata could specify fixed sizes of type 302 and length 304, valid values of type 302 and length 304, sizes of sub-fields 308 in value 306, attributes represented by sub-fields 308 in value, and/or other information that can be used to process TLV 232. The device could determine expected length 314 by summing the fixed sizes of sub-fields 308, multiplying a value that is stored in a first sub-field 308 and that represents the number of entries in a list with the fixed size of each entry in the list, and/or performing additional processing or computation related to the metadata and/or values stored in sub-fields 308. In turn, expected length 314 encompasses data in value 306 that can be processed according to the specification for network protocol version 310.

Next, the device identifies a portion 312 of value 306 that spans expected length 314 and performs processing 316 on sub-fields 308 in portion 312. In some embodiments, portion 312 starts at the beginning of value 306 and ends at the number of bytes represented by expected length 314 past the beginning of value 306. Sub-fields 308 included in portion 312 may be added by older versions of the network protocol, up to network protocol version 310 implemented by the device.

Conversely, any sub-fields 308 that lie past expected length 314 may be added by versions of the network protocol that are newer than network protocol version 310 implemented by the device. Because these sub-fields are not supported by network protocol version 310, the device omits processing of these sub-fields 308 and continues processing of additional elements following TLV element 232 in the frame.

FIG. 4A illustrates an exemplar specification for a TLV element from an older version of a network protocol, according to various embodiments. As shown, the example specification is represented as a table with multiple rows 402-406 that describe various components of the TLV element. Row 402 indicates that the type field in the TLV element is one byte long and set to a value of "0x01" that represents link quality, row 404 indicates that the length field in the TLV element is one byte long and set to a value of 1, and row 406 indicates that the TLV element includes an RSSI field that is one byte long and stores a Received Signal Strength Indicator (RSSI) value for a link. In this example, the RSSI field is the only sub-field of the value field in the TLV element and has a length that matches the value stored in the length field.

FIG. 4B illustrates an exemplar specification for the TLV element of FIG. 4A from a newer version of the network protocol, according to various embodiments. As with the example specification of FIG. 4A, the example specification of example 4B is represented as a table with multiple rows 412-418 that describe various components of the TLV element. Row 412 is identical to row 402 and indicates that the type field in the TLV element is one byte long and set to a value of "0x01" that indicates link quality. Row 414 differs from row 404 and indicates that the length field in the TLV element is one byte long and set to a value of 2. Row 416 is identical to row 406 and indicates that the TLV element includes an RSSI field that is one byte long and stores a Received Signal Strength Indicator (RSSI) value for a link. Row 418 is added by the newer version of the network protocol and indicates that the TLV element also includes an SNR field, which is one byte long and stores a Signal-to-Noise Ratio (SNR) value for the same link. The RSSI and SNR fields are sub-fields of the value field in the TLV element. Moreover, a combined length of the RSSI and SNR fields matches the value stored in the length field.

A given device that implements the older version of the network protocol is able to use the RSSI field to perform processing related to the quality of the link. For example, the value stored in the RSSI field could be communicated to the device by another device at the other end of the link, which allows the device to estimate the bidirectional quality of the link using an RSSI value measured by the device and the RSSI value communicated to the device from the other device. This link quality estimation could then be used by the device for routing purposes.

A given device that implements the newer version of the network protocol is able to use both the RSSI and SNR fields in the TLV element. Continuing with the above example, the device could use values stored in the RSSI and SNR fields of the TLV element, as well as values of RSSI and SNR measured by the device, to calculate a better estimate of the bidirectional quality of the link with the other device.

FIG. 5A illustrates an exemplar specification for a TLV element from an older version of a network protocol, according to various embodiments. As with the example specifications of FIGS. 4A-4B, the example specification of FIG. 5A is represented as a table with multiple rows 502-510 that describe various components of the TLV element. Row 502 indicates that the type field in the TLV element is one byte long and set to a value of "0x02" that represents neighbors seen by a given node, and row 504 indicates that the length field is one byte long and set to 9+8*the number of neighbors seen by the node.

Rows 506-510 describe various sub-fields in the value field of the TLV element. In particular, row 506 indicates that the value field includes a sub-field that is eight bytes long and stores the address of the node. Row 508 indicates that the value field includes a sub-field that is one byte long and stores the number of elements in a neighbor address list sub-field. Row 510 indicates that the neighbor address list sub-field has a variable size that is 8*the number of neighbors seen by the node (as stored in the previous sub-field) and includes a list of the neighbors' addresses.

FIG. 5B illustrates an exemplar specification for the TLV element of FIG. 5A from a newer version of the network protocol, according to various embodiments. In the example specification of FIG. 5B, row 512 is identical to row 502 and indicates that the type field in the TLV element is one byte long and set to a value of "0x02" that represents neighbors seen by a given node. Row 514 differs from row 504 and indicates that the length field is one byte long and set to 9+9*the number of neighbors seen by the node. Rows 516 is identical to row 506, row 518 is identical to row 508, and row 520 is identical to row 510. Row 522 is added by the newer version of the network protocol and indicates that the value field includes an additional sub-field that stores a list of link qualities between the node and neighbors represented in the neighbor address list.

The TLV element represented by the example specifications of FIGS. 5A-5B may be used by a receiving device to obtain information related to the neighbors of a sending device. Both specifications include a variable-size sub-field described in rows 510 and 520 (i.e., "Neighbor Address List"). In particular, rows 510 and 520 indicate that the length of this variable-size sub-field is determined using the value stored in the fixed-size sub-field described in rows 508 and 518 (i.e., "Number of Neighbors") and not using the length field in the TLV element. The new variable-size sub-field described in row 522 (i.e., "Neighbor Link Quality List") also has a length that can be determined using the value stored in the fixed-size sub-field described in rows 508 and 518.

A device that implements the older version of the network protocol is thus able to receive a list of addresses for neighbors of another device, while a device that implements the newer version of the network protocol can also utilize link qualities between the other device and the neighbors in the list. Because the size of each sub-field of the value field can be resolved using data in the specification and/or other sub-fields, additional fixed- or variable-size sub-fields may continue to be appended to the end of existing sub-fields by subsequent versions of the network protocol without interfering with a device's ability to accurately identify or locate the existing sub-fields within the value field, as long as the rules for processing and designing TLV elements described above are followed.

For example, the TLV element represented by the specification of FIG. 5B could include an additional fixed-size "Neighbor Link Quality Element Size" sub-field that is one byte long and stores the length (in bytes) of each entry in the "Neighbor Link Quality List" sub-field described in row 522. This additional sub-field could be included in the TLV element between the "Neighbor Address List" sub-field and the "Neighbor Link Quality List" sub-field. The value stored in this sub-field could then be used to interpret values in the "Neighbor link Quality List" sub-field. In particular, a value of "1" stored in the sub-field could indicate that each entry in the "Neighbor Link Quality List" stores a one-byte value representing an RSSI measurement for a link with a corresponding neighbor. A value of "2" stored in the sub-field could indicate that each entry in the "Neighbor Link Quality List" stores two one-byte values, where the first value includes the RSSI measurement and the second value includes an SNR for the same link. In this example, the length of the "Neighbor Address List" sub-field is calculated using the "Number of Neighbors" sub-field, and the length of the "Neighbor Link Quality List" is calculated using both the "Number of Neighbors" sub-field and the additional "Neighbor Link Quality Element Size" sub-field. In turn, the total length of the value field in the TLV is calculated as 10+8*the number of neighbors seen by the node+the size of each element in the "Neighbor Link Quality List" sub-field (as stored in the "Neighbor Link Quality Element Size" sub-field)*the number of neighbors seen by the node.

In another example, the TLV represented by the specification of FIG. 5B could include two additional sub-fields. The first sub-field could be of fixed size and store a number of "preferred" neighbors of the node, and the second sub-field could be of variable size and store a list of addresses of the node's preferred neighbors. The size of the second sub-field could be determined by multiplying the number stored in the first sub-field by a number of bytes occupied by each address in the list.

Figure 6:
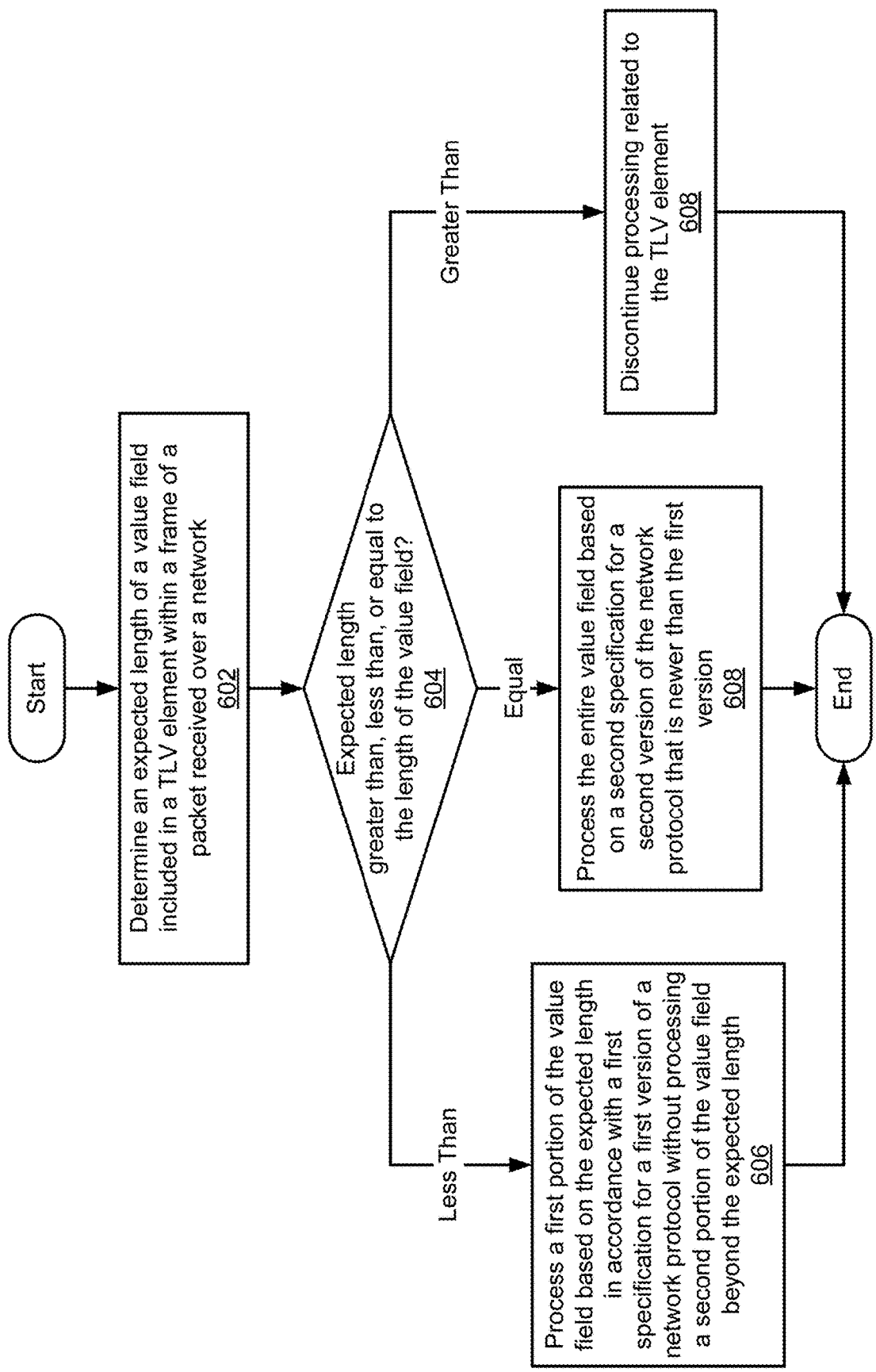
FIG. 6 is a flow chart of method steps for processing network packets transmitted within a network in accordance with a network protocol, according to various embodiments.

FIG. 6 is a flow chart of method steps for processing network packets transmitted within a network in accordance with a network protocol, according to various embodiments. Although the method steps are described in conjunction with the systems of FIGS. 1-2, persons skilled in the art will understand that any system configured to perform the method steps, in any order, is within the scope of the present invention.

As shown, software application 242 determines 602 an expected length of a value field included in a TLV element within a frame of a packet received over a network. For example, software application 242 could calculate the expected length based on a type field included in the TLV element and one or values included in the value field. The value stored in the type field could allow software application 242 to retrieve a mapping that includes the value in the type field and specifies the length of one or more values and/or sub-fields in the value field from a specification for a version of the network protocol implemented by software application 242. Software application 242 could use information in the mapping and/or the value(s) stored in the value field to determine the length of each sub-field in the value field identified in the specification. Software application 242 could then sum the lengths of all sub-fields identified in the specification to obtain the expected length of the value field.

Next, software application 242 determines 604 if the expected length is greater than, less than, or equal to the length of the value field. For example, software application 242 could perform operation 604 by comparing the expected length with the value stored in the length field of the TLV element.

If the expected length is less than the length of the value field, software application 242 processes 606 a first portion of the value field based on the expected length in accordance with a first specification for a first version of the network protocol without processing a second portion of the value field beyond the expected length. For example, software application 242 could use the first specification to process all sub-fields from the start of the value field up to the expected length of the value field. Software application 242 could determine the length of the second portion by subtracting the expected length from the length of the value field and skip the remainder of the value field by advancing the length of the second portion past the end of the first portion. Software application 242 could then process one or more additional elements in the frame following the end of the second portion.

If the expected length is equal to the length of the value field, software application 242 processes 608 the entire value field based on a second specification of the network protocol that is newer than the first version. For example, the second specification could include an updated format or definition for the TLV element, which allows sub-fields in the second portion of the value field to be processed and used. Software application 242 could perform operation 608 after receiving a software update that includes the second specification and/or that allows software application 242 to implement the newer version of the network protocol.

If the expected length is greater than the length of the value field, software application 242 discontinues 608 processing related to the TLV element. For example, software application 242 could discard the TLV element because the TLV element does not conform to the version of the network protocol implemented by software application 242. Alternatively, if software application 242 supports multiple versions of the network protocol and the most recent version supported by software application 242 results in an expected length that is greater than the length of the value field, software application 242 could try to find a version that produces an expected length that is equal to or less than the length of the value field and process some or all of the value field according to the specification for the version.

In sum, the disclosed techniques support the design and processing of TLV elements in frames across multiple versions of a network protocol. Design of the TLV elements includes conforming to a first rule specifying that all sub-fields of a value field in a TLV element have a known size, and that this known size is determined based on a specification for the network protocol and/or values of other sub-fields in the value field instead of the length field in the TLV element. Design of the TLV elements also includes conforming to a second rule specifying that a TLV element can be modified by appending new sub-fields to the end of existing sub-fields in the value field, and that the TLV element cannot be modified by removing existing sub-fields from the value field. Processing of the TLV elements includes conforming to a first rule specifying that a TLV with a length that is smaller than expected is to be ignored and not processed, as well as a second rule specifying that a TLV with a length that is greater than expected will be processed up to the expected length and not processed past the expected length. These rules ensure that older versions of the network protocol can be used to locate and process sub-fields defined in specifications for the older versions while allowing newer versions of the network protocol to add and make use of new sub-fields in the value field. Further, the lack of dependence on the length field in resolving the sizes of individual sub-fields allows various permutations of fixed-size and variable-size sub-fields to be included in the value field and subsequently located or identified within the value field.

One technical advantage of the disclosed techniques relative to the prior art is that the disclosed techniques enable a TLV element within a frame to be updated based on both fixed-length and variable-length sub-fields within the value field of the TLV element. With this approach, functionality related to new versions of the network protocol can be added, while ensuring that the TLV element can still be processed based on older versions of the network protocol, which enhances cross-compatibility across different versions of the network protocol. Another technical advantage is that the disclosed techniques require a smaller number of TLV elements to be added to a given frame relative to prior art approaches, which reduces overall overhead when transmitting and processing network packets in accordance with different versions of a network protocol. These technical advantages provide one or more technological improvements over prior art approaches.

1. In some embodiments, a method for processing packets transmitted within a network in accordance with a network protocol comprises determining a first expected length of a value field included in a type-length-value (TLV) element within a first frame of a first packet received over the network, wherein the first expected length is based on a type field included in the TLV element; and processing a first portion of the value field based on the expected length of the value field in accordance with a first version of the network protocol, without processing a second portion of the value field beyond the expected length of the value field.

2. The method of clause 1, further comprising processing the first portion and a second portion of the value field included in the TLV element within a second frame based on a second version of the network protocol that is newer than the first version of the network protocol.

3. The method of any of clauses 1-2, further comprising receiving a software update that includes the second version of the network protocol prior to processing the first portion and the second portion of the value field included in the TLV element within the second frame.

4. The method of any of clauses 1-3, wherein the first portion includes a first sub-field that is processed in accordance with the first version of the network protocol and a second version of the network protocol and the second portion includes a second sub-field that is processed in accordance with the second version of the network protocol.

5. The method of any of clauses 1-4, further comprising determining that a length of the value field included in the TLV element within a second frame is shorter than a second expected length of the value field; and in response, discontinuing one or more processing operations associated with the TLV element within the second frame.

6. The method of any of clauses 1-5, wherein determining the first expected length of the value field comprises determining a size of a first sub-field of the value field based on a second sub-field of the value field.

7. The method of any of clauses 1-6, wherein the second sub-field specifies a number of elements included in the first sub-field.

8. The method of any of clauses 1-7, wherein determining the first expected length of the value field comprises mapping the type field with one or more lengths associated with one or more values included in the value field based on the first version of the network protocol.

9. The method of any of clauses 1-8, wherein processing the first portion of the value field comprises processing one or more additional elements following an end of the value field in the TLV element after processing of the first portion of the value field is complete.

10. The method of any of clauses 1-9, wherein the first expected length is further based on one or more values included in the value field.

11. In some embodiments, a non-transitory computer readable medium stores instructions that, when executed by a processor, cause the processor to perform the steps of determining a first expected length of a value field included in a type-length-value (TLV) element within a first frame of a first packet received over the network, wherein the first expected length is based on a type field included in the TLV element and a first specification for a first version of a network protocol; and processing a first portion of the value field based on the expected length of the value field in accordance with the first specification for the first version of the network protocol, without processing a second portion of the value field beyond the expected length of the value field.

12. The non-transitory computer readable medium of clause 11, wherein the instructions further cause the processor to perform the steps of receiving a software update that includes a second specification for a second version of the network protocol that is newer than the first version of the network protocol; and processing the first portion and a second portion of the value field included in the TLV element within a second frame based on the second specification.

13. The non-transitory computer readable medium of any of clauses 11-12, wherein the first portion includes a first sub-field that is processed in accordance with the first specification and the second portion includes a second sub-field that is processed in accordance with a second specification for a second version of the network protocol.

14. The non-transitory computer readable medium of any of clauses 11-13, wherein the instructions further cause the processor to perform the steps of determining that a length of the value field included in the TLV element within a second frame is shorter than a second expected length of the value field; and in response, discontinuing one or more processing operations associated with the TLV element within the second frame.

15. The non-transitory computer readable medium of any of clauses 11-14, wherein determining the first expected length of the value field comprises determining a first size of a first sub-field of the value field based on a second sub-field of the value field; and determining the first expected length based on the first size of the first sub-field and a second size of the second sub-field.

16. The non-transitory computer readable medium of any of clauses 11-15, wherein the second sub-field specifies a number of elements included in the first sub-field.

17. The non-transitory computer readable medium of any of clauses 11-16, wherein determining the first expected length of the value field comprises summing one or more lengths of the one or more values included in the value field.

18. The non-transitory computer readable medium of any of clauses 11-17, wherein processing the first portion of the value field comprises skipping a length of the second portion based on the expected length of the value field and a length field included in the TLV element within the first frame; and processing one or more additional elements in the frame following an end of the second portion.

19. The non-transitory computer readable medium of any of clauses 11-18, wherein the network comprises a mesh network.

20. In some embodiments, a system comprises a memory that stores instructions, and a processor that is coupled to the memory and, when executing the instructions, is configured to determine a first expected length of a value field included in a type-length-value (TLV) element within a first frame of a first packet received over the network, wherein the first expected length is based on a type field included in the TLV element; and process a first portion of the value field based on the expected length of the value field in accordance with a first specification for a first version of the network protocol, without processing a second portion of the value field beyond the expected length of the value field.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
  receiving, by a network device in a mesh network, a type-length-value (TLV) element;
  determining, by the network device based on both a first type identified in a type field of the TLV element and a first version of a network protocol implemented by the network device for processing the TLV element, an expected length of a value field of the TLV element, wherein:
    the first version of the network protocol specifies that value fields of TLV elements having type fields identifying the first type have the expected length,
    a second version of the network protocol specifies that value fields of TLV elements having type fields identifying the first type have a second expected length different from the expected length, and the expected length is greater than zero; and processing, by the network device, the value field up to the expected length.

2. The method of claim 1, wherein determining the expected length of the value field is further based on a value in a sub-field of the value field.

3. The method of claim 2, wherein the value in the sub-field identifies a number of entries in a second sub-field.

4. The method of claim 1, wherein the expected length of the value field is equal to or shorter than a length of the value field included in a length field of the TLV element.

5. The method of claim 1, wherein:

processing the value field up to the expected length comprises processing the value field up to the expected length according to the first version of the network protocol; and the TLV element is compatible with the second version of the network protocol, and the second version of the network protocol is newer than the first version of the network protocol.

6. The method of claim 5, wherein the value field includes a sub-field beyond the expected length that is included in the second version of the network protocol and is not included in the first version of the network protocol.

7. The method of claim 5, wherein:

a first TLV element compatible with the first version of the network protocol includes a first plurality of sub-fields in the value field;

a second TLV element compatible with the second version of the network protocol includes a second plurality of sub-fields in the value field; and the second plurality of sub-fields includes the first plurality of sub-fields.

8. The method of claim 1, further comprising:

receiving, by the network device, a second TLV element;

determining, by the network device based on both a second type identified by a type field of the second TLV element and the first version of the network protocol, an expected length of a value field of the second TLV element; and in response to determining that the expected length of the value field of the second TLV element is longer than a length of the value field of the second TLV element specified by a length field of the second TLV element, discarding, by the network device, the second TLV element without processing the value field of the second TLV element.

9. A node in a mesh network, comprising:

one or more processors; and a memory storing executable instructions that, when executed by the one or more processors, cause the one or more processors to:

receive, via a link coupling the node to a second node in the mesh network, a network packet including a type-length-value (TLV) element, the TLV element comprising a type field, a length field, and a value field;

compute, based on both a first type of the TLV element identified in the type field and a first version of a network protocol implemented by the node for processing the TLV element, an anticipated length of the value field, wherein:

the first version of the network protocol specifies that value fields of TLV elements having type fields identifying the first type have the anticipated length, a second version of the network protocol specifies that value fields of TLV elements having type fields identifying the first type have a second anticipated length different from the anticipated length, and the anticipated length is greater than zero; and perform one or more operations on a portion of the value field up to the anticipated length.

10. The node of claim 9, wherein the anticipated length of the value field is further computed based on a first version of a frame format for the TLV element.

11. The node of claim 10, wherein:

the one or more processors perform the one or more operations on the portion of the value field according to the first version of the frame format; and the TLV element is compatible with a second version of the frame format used by the second node, the second version of the frame format being newer than the first version of the frame format.

12. The node of claim 11, wherein the value field includes a sub-field in the portions of the value field past the anticipated length that is included in the second version of the frame format and is not included in the first version of the frame format.

13. The node of claim 9, wherein the anticipated length of the value field is further computed based on a value included in a sub-field of the value field.

14. The node of claim 9, wherein the anticipated length of the value field is equal to or shorter than a length of the value field specified by the length field.

15. A non-transitory computer-readable medium storing instructions that, when executed by a computing device, cause the computing device to perform operations comprising:

receiving, via a link in a mesh network, a network frame, the network frame including a type-length-value (TLV) element having a type field, a length field, and a value field;

determining, based on the type field, a first type of the TLV element;

determining, based on at least (i) the type of the TLV element, (ii) a first version of a network protocol implemented by the computing device for processing the TLV element, and (iii) a mapping, an expected number of bytes in the value field, wherein:

the first version of the network protocol specifies that value fields of TLV elements having type fields identifying the first type have the expected number of bytes, a second version of the network protocol specifies that value fields of TLV elements having type fields identifying the first type have a second expected number of bytes different from the expected number of bytes, and the expected number of bytes in the value field is greater than zero; and processing a beginning portion of the value field that includes the expected number of bytes.

16. The non-transitory computer-readable medium of claim 15, wherein determining the expected number of bytes comprises determining, based on a value in a first sub-field of the value field, a size of a second sub-field in the value field.

17. The non-transitory computer-readable medium of claim 15, further comprising:
   determining, based on the length field, a number of bytes in the value field; and
   determining that the expected number of bytes in the value field is less than or equal to the number of the bytes in the value field.

18. The non-transitory computer-readable medium of claim 15, further comprising:
   receiving, via the link, a second TLV element having a second type field, a second length field, and a second value field;
   determining, based on the second type field, a second type of the second TLV element;
   determining, based on at least (i) the second type of the second TLV element, (ii) the first version of the network protocol implemented by the computing device for processing the TLV element, and (iii) the mapping, a third expected number of bytes in the second value field;
   determining, based on the second length field, a number of bytes in the second value field; and
   in response to determining that the third expected number of bytes of the second value field is greater than the number of bytes in the second value field, discarding the second TLV element without processing the second value field.

* * * * *